(12) United States Patent
Rodgers et al.

(10) Patent No.: US 8,013,054 B2
(45) Date of Patent: Sep. 6, 2011

(54) ELASTOMERIC COMPOSITIONS HAVING IMPROVED PROPERTIES

(75) Inventors: Michael Brendan Rodgers, Seabrook, TX (US); David J. Lohse, Bridgewater, NJ (US); Scott C. Solis, Houston, TX (US); Rick D. Davis, Ijamsville, MD (US); Jung Hun Lee, Seoul (KR)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 12/492,747

(22) Filed: Jun. 26, 2009

(65) Prior Publication Data

US 2010/0036038 A1   Feb. 11, 2010

Related U.S. Application Data

(60) Provisional application No. 61/087,461, filed on Aug. 8, 2008.

(51) Int. Cl.
| | |
|---|---|
| *C08L 25/00* | (2006.01) |
| *C08L 7/00* | (2006.01) |
| *C08L 9/06* | (2006.01) |
| *C08K 5/01* | (2006.01) |
| *C08K 5/02* | (2006.01) |

(52) U.S. Cl. ............... 524/574; 524/525; 524/575.5; 524/445; 524/474; 524/476; 524/485

(58) Field of Classification Search .............. 524/502, 524/525, 574, 575.5, 445, 474, 476, 485
See application file for complete search history.

(56) References Cited

U.S. PATENT DOCUMENTS

| | | | |
|---|---|---|---|
| 5,783,531 | A | 7/1998 | Andrew et al. |
| 6,710,116 | B1 | 3/2004 | Waddell et al. |
| 7,425,591 | B2 | 9/2008 | Dias et al. |
| 2004/0092648 | A1* | 5/2004 | Jones et al. ............. 524/502 |
| 2006/0167184 | A1* | 7/2006 | Waddell et al. ......... 525/192 |
| 2008/0021149 | A1* | 1/2008 | Jones et al. ............. 524/547 |
| 2009/0050251 | A1 | 2/2009 | Tracey et al. |

FOREIGN PATENT DOCUMENTS

| | | |
|---|---|---|
| WO | 2004/044052 | 5/2004 |
| WO | 2007/078369 | 7/2007 |

* cited by examiner

*Primary Examiner* — James J Seidleck
*Assistant Examiner* — Deve E Valdez
(74) *Attorney, Agent, or Firm* — Nancy T. Krawcyzk

(57) ABSTRACT

Elastomeric compositions comprising at least one $C_4$ to $C_7$ monoolefin elastomer, at least one polyalphaolefin, and optionally at least one hydrocarbon polymer additive are disclosed. The PAO comprises oligomers of one or more $C_2$ to $C_{20}$ alpha-olefins having a kinematic viscosity at 100° C. of 3 to 3000 cSt and a Mw/Mn of less than 4. In one aspect, the elastomeric composition may have improved flex fatigue properties and have a fatigue life of 450,000 Kc or more as measured by ASTM D 412 die C. In another aspect, an elastomeric composition may have improved impermeability and have a permeation coefficient at 40° C. of 160 cc*mm/($m^2$–day) or less.

12 Claims, No Drawings

ELASTOMERIC COMPOSITIONS HAVING IMPROVED PROPERTIES

PRIORITY CLAIM

This application claims the benefit of prior U.S. provisional application Ser. No. 61/087,461 filed Aug. 8, 2008 which is hereby incorporated by reference in its entirety.

FIELD OF THE INVENTION

This invention relates to elastomeric compositions having improved impermeability. More particularly, this invention relates to cured elastomeric compositions having improved impermeability comprising hydrocarbon polymer additives and polyalphaolefins.

BACKGROUND OF THE INVENTION

Elastomeric compositions are used in a wide variety of applications, including hoses, belts, footwear components, vibration isolation devices, tires, and tire components such as treads, innerliners, and sidewalls. The selection of ingredients for the commercial formulation of an elastomeric composition depends upon the balance of properties desired, the application, and the application's end use.

For example, in the tire industry the balance between processing properties of the green (uncured) composition in the tire plant and in-service performance of the cured rubber tire composite is of particular importance. The ability to improve the endurance of tires used in a wide variety of conditions, such as is required for agricultural tires, aircraft tires, earthmover tires, heavy-duty truck tires, mining tires, motorcycle tires, medium truck tires, and passenger car tires, while maintaining ease of processability of the uncured elastomeric composition is also of significant importance. Additionally, the goals of improving air impermeability properties, flex fatigue properties, and the adhesion of the elastomeric composition to adjoining tire components without affecting the processability of the uncured elastomeric composition or while maintaining or improving the physical property performance of the cured elastomeric composition still remain.

Conventionally, various processing oils, such as naphthenic, paraffinic, and aromatic oils, have been added to many tire components to aid compound processing. Naphthenic oil has been preferred for tire innerliner compounds due to its processing effectiveness and beneficial secondary properties, e.g. compatibility with isobutylene based elastomers. However, while these conventional processing oils improve processability, this benefit may have an undesirable impact on various other properties, including air impermeability.

Generally, the raw ingredients and materials used in tire compounding impact all tire performance variables, thus, any alternative to conventional processing oils must be compatible with the rubbers, not interfere with the vulcanization rate, be easily dispersed in all tire compounds, be cost effective, and not adversely impact tire performance. This is of particular concern for tire innerliners and tire innertubes where performance properties must be maintained within specified tolerance levels. For example, small increases in a tire innerliner compound's 300% modulus can lead to reduction in fatigue resistance and cracks with consequential loss in tire durability. Furthermore, for an elastomeric composition that acts as an air barrier it is of particular importance that any benefits in compound processability are not to the detriment of the composition's air retention capabilities.

Tubeless tires require elastomeric compositions having high air retention. Halobutyl rubber has been used in tire innerliner compounds to enable improvements in air retention performances, improvements in liner-to-tire casing adhesion, and improvements in tire durability. Additionally, clays have been added to elastomeric compositions to form "nanocomposites" in order to alter the composition's properties and improve air barrier properties. For example, nanocomposites have been formed by adding clay to brominated copolymers of isobutylene and p-methylstyrene. Processing aids such as naphthenic, paraffinic, and aliphatic resins have been used to improve the processability of elastomeric compounds containing nanocomposites. However, these processing aids often increase the elastomeric compositions permeability.

As many tires are compounded and engineered for particular performance characteristics, it is desirable that any replacement for traditional process oils maintains tire performance characteristics, such as rolling resistance, traction, and wear performance. Improvement in air retention qualities can allow improved maintenance of tire rolling resistance performance through the service life of the tire, improved durability, and lower tire operating temperatures, thus there is still a need for a replacement for traditional process oils in tire and tire innerliner compounds which allow for beneficial compound processability and improved tire innerliner impermeability.

SUMMARY OF THE INVENTION

Elastomeric compositions comprising at least one $C_4$ to $C_7$ monoolefin elastomer, at least one polyalphaolefin ("PAO"), and optionally at least one hydrocarbon polymer additive ("HPA") are disclosed. The PAO comprises oligomers of one or more $C_2$ to $C_{20}$ alpha-olefins having a kinematic viscosity at 100° C. of 3 to 3000 cSt and a Mw/Mn of less than 4. Preferably the elastomeric composition comprises from 2 to 40 phr of the PAO. The elastomeric composition may be cured.

In one aspect, the elastomeric composition has improved flex fatigue properties and has a fatigue life of 450,000 Kc or more as measured by ASTM D 412 die C. In some embodiments, the PAO has a kinematic viscosity at 100° C. in the range of 6 to 10 cSt.

In another aspect, an elastomeric composition has improved impermeability and has a permeation coefficient at 40° C. of 160 cc*mm/($m^2$–day) or less. In some embodiments, the PAO has a kinematic viscosity at 100° C. in the range of 80 to 120 cSt. In some embodiments, the PAO has a molecular weight (Mw) of 2000 g/mole or more.

In further aspects, this disclosure relates to an air barrier, such as a tire innerliner, innertube, or hose. The air barrier comprises an elastomeric composition which is made by the method of combining at least one $C_4$-$C_7$ monoolefin based elastomer, at least one filler, at least one clay, at least one HPA, at least one PAO, and at least one cure agent. The PAO comprises oligomers of one or more $C_2$ to $C_{20}$ alpha-olefins having a kinematic viscosity at 100° C. of 3 to 3000 cSt and a Mw/Mn of less than 4. Preferably the elastomeric composition comprises from 2 to 40 phr of the PAO. The combined components are then cured.

In one embodiment, and in combination with any of the above disclosed aspects or embodiments, the HPA may be present in the range of 10 to 40 phr. The HPA preferably comprises a cyclic component, and more preferably comprises dicyclopentadiene. The HPA may have a softening point in the range of about 115° C. to about 130° C., as measured by ASTM E28-99.

In a preferred embodiment, and in combination with any of the above disclosed aspects or embodiments, the elastomeric composition and/or air barrier are substantially free of naphthenic oil.

In another embodiment, and in combination with any of the above disclosed aspects or embodiments, the $C_4$-$C_7$ monoolefin based elastomer may be selected from the group consisting of butyl rubber, halogenated butyl rubber, branched ("star-branched") butyl rubber, halogenated star-branched butyl rubber, poly(isobutylene-co-p-methylstyrene), halogenated poly(isobutylene-co-p-methylstyrene), general purpose rubber, natural rubber, polybutadiene rubber, polyisoprene rubber, styrene-butadiene rubber, styrene-isoprene-butadiene rubber, isoprene-butadiene rubber, high cis-polybutadiene, ethylene-propylene rubber, ethylene-propylene-diene rubber, nitrile rubber, brominated butyl rubber, chlorinated butyl rubber, star-branched polyisobutylene rubber, and mixtures thereof. In preferred embodiments, the elastomer is a halogenated poly(isobutylene-co-p-methylstyrene).

In a further embodiment, and in combination with any of the above disclosed aspects or embodiments, the clay may be an exfoliated clay selected from the group consisting of exfoliated natural or synthetic montmorillonite, nontronite, beidellite, volkonskoite, laponite, hectorite, saponite, sauconite, magadite, kenyaite, steensite, vermiculite, halloysite, aluminate oxides, hydrotalcite, and mixtures thereof.

In still another embodiment, and in combination with any of the above disclosed aspects or embodiments, the elastomeric composition or air barrier may further comprise a filler which may be selected from calcium carbonate, mica, silica, silicates, talc, titanium dioxide, starch, wood flour, carbon black, and mixtures thereof.

These and other objects, features, and advantages will become apparent as reference is made to the following detailed description, preferred embodiments, examples, and appended claims.

DETAILED DESCRIPTION OF THE INVENTION

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

The term "phr" means parts per hundred parts of rubber, and is a measure common in the art wherein components of a composition are measured relative to the total of all of the elastomer (rubber) components. The total phr or parts for all rubber components, whether one, two, three, or more different rubber components is present in a given recipe is defined as 100 phr. All other non-rubber components are ratioed against the 100 parts of rubber and are expressed in phr.

The term "elastomer," as used herein, refers to any polymer or combination of polymers consistent with the ASTM D1566 definition, incorporated herein by reference. As used herein, the term "elastomer" may be used interchangeably with the term "rubber."

Substantially free of a hydrocarbon polymer additive component is defined to mean that the hydrocarbon polymer additive comprises less than 0.5 wt % of the component, or more preferably less than 0.25 wt % of the component, or most preferably less than 0.1 wt % of the component.

The elastomeric compositions can include various elastomers, polyalphaolefins, hydrocarbon polymer additives, and fillers. In one embodiment, the various elastomers are present in the elastomeric composition at 100 phr either alone or in some combination with one another, with polyalphaolefins ("PAOs") being present in the range of 2 to 40 phr, and with hydrocarbon polymer additives ("HPAs") being present in the range of 5 to 50 phr.

In one embodiment the elastomeric composition is used in a tire or tire component, such as a tire innerliner. In model tire innerliner compounds, the elastomeric composition may comprise: 100 phr of elastomer(s); 2 to 40 phr of PAO(s); optionally, 5 to 50 phr of hydrocarbon polymer additive(s); optionally, 50 to 90 phr of fillers such as, for example, carbon black and/or silica; optionally, about 4 to about 15 phr of clay(s); optionally, about 0.5 to 5 phr of ZnO; optionally, about 1 phr of stearic acid; optionally, about 1 to 5 phr of accelerators; optionally, about 0.25 to 1.50 phr of sulfur; and optionally, about 5 phr of other processing aids.

In some embodiments, the polyalphaolefin(s) and/or HPAs can be used in addition to other processing aids and oils, or as a replacement for other processing aids and oils. Preferably, the elastomeric compositions are substantially free of aromatic oils. Substantially free of aromatic oils is defined to mean that aromatic oil has not deliberately been added to the elastomeric composition or, in the alternative, if present, the elastomeric composition comprises less than 0.5 phr of aromatic oil, or more preferably less than 0.25 phr of aromatic oil, or most preferably less than 0.1 phr of aromatic oil. Aromatic oils are compounds containing at least 35% by mass of single- and multiple-ring components. Generally, aromatic oils contain unsaturated polycyclic components.

In some embodiments, the elastomeric composition may contain naphthenic oil. In other preferred embodiments, the elastomeric composition is substantially free of naphthenic oil. Substantially free of naphthenic oils is defined to mean that naphthenic oil has not deliberately been added to the elastomeric composition, or, in the alternative, if present the elastomeric composition comprises less than 0.5 phr of naphthenic oil, or more preferably less than 0.25 phr of naphthenic oil, or most preferably less than 0.1 phr of naphthenic oil. Generally, naphthenic oils have a viscosity gravity constant of about 0.85 as described in ASTM D2501, a glass transition temperature (Tg) of about $-60°$ C., and a nominal aniline point of about 90 as described in ASTM D611.

Elastomer

The elastomeric composition comprises at least one elastomer. Typical elastomers that may be included in the elastomeric compositions are $C_4$ to $C_7$ monoolefin based rubbers, such as butyl rubber (isoprene-isobutylene rubber, "IIR"), branched ("star-branched") butyl rubber, star-branched polyisobutylene rubber, bromobutyl ("BIIR"), chlorobutyl ("CIIR"), random copolymers of isobutylene and para-methylstyrene (poly(isobutylene-co-p-methylstyrene)), halogenated poly(isobutylene-co-p-methylstyrene) ("BIMSM"), polybutadiene rubber ("BR"), high cis-polybutadiene, polyisoprene rubber, isoprene-butadiene rubber ("IBR"), styrene-isoprene-butadiene rubber ("SIBR"), styrene-butadiene rubber ("SBR"), solution-styrene-butadiene rubber ("sSBR"), emulsion-styrene-butadiene rubber, nitrile rubber, ethylene propylene rubber ("EP"), ethylene-propylene-diene rubber ("EPDM"), synthetic-polyisoprene, general purpose rubber, natural rubber, any halogenated versions of these elastomers, and mixtures thereof. Preferred elastomers include isobutylene based elastomers such as, IIR, halogenated IIR, and halogenated poly(isobutylene-co-p-methylstyrene). Useful elastomers can be made by any suitable means known in the art, and the invention is not herein limited by the method of producing the elastomer.

In some embodiments, the elastomeric composition comprises a blend of two or more elastomers. Blends of elastomers may be reactor blends and/or melt mixes. The individual elastomer components may be present in various amounts, with the total elastomer content in the elastomeric composition being expressed as 100 phr in the formulation.

Useful elastomers include isobutylene-based homopolymers or copolymers. An isobutylene based elastomer refers to an elastomer or polymer comprising at least 70 mol % repeat units from isobutylene. These polymers can be described as random copolymers of a $C_4$ to $C_7$ isomonoolefin derived unit, such as an isobutylene derived unit, and at least one other polymerizable unit. The isobutylene-based elastomer may or may not be halogenated.

The elastomer may also be a butyl-type rubber or branched butyl-type rubber, including halogenated versions of these elastomers. Useful elastomers are unsaturated butyl rubbers such as homopolymers and copolymers of olefins, isoolefins and multiolefins. Non-limiting examples of other useful unsaturated elastomers are poly(isobutylene-co-isoprene), polyisoprene, polybutadiene, polyisobutylene, poly(styrene-co-butadiene), natural rubber, star-branched butyl rubber, and mixtures thereof.

The elastomer may or may not be halogenated. Preferred halogenated elastomers may be selected from the group consisting of halogenated butyl rubber, bromobutyl rubber, chlorobutyl rubber, halogenated branched ("star-branched") butyl rubbers, and halogenated random copolymers of isobutylene and para-methylstyrene. Halogenation can be carried out by any means, and the invention is not herein limited by the halogenation process.

In one embodiment, the elastomer may be a branched or "star-branched" butyl rubber ("SBB"). The SBB is typically a composition of a butyl rubber, either halogenated or not, and a polydiene or block copolymer, either halogenated or not. In one embodiment, the SBB or halogenated-SBB is a composition of a butyl or halogenated butyl rubber and a copolymer of a polydiene and a partially hydrogenated polydiene selected from the group including styrene, polybutadiene, polyisoprene, polypiperylene, natural rubber, styrene-butadiene rubber, ethylene-propylene diene rubber ("EPDM"), ethylene-propylene rubber ("EP"), styrene-butadiene-styrene and styrene-isoprene-styrene block copolymers. These polydienes are present in one embodiment, based on the monomer wt %, greater than 0.3 wt %, or in another embodiment in the range of 0.3 to 3 wt % or in the range of 0.4 to 2.7 wt %.

The elastomer may be a random copolymer comprising a $C_4$ to $C_7$ isomonoolefin, such as isobutylene and an alkylstyrene comonomer, such as para-methylstyrene, containing at least 80%, alternatively at least 90%, by weight of the para-isomer. In one embodiment, the polymer may be a random elastomeric copolymer of ethylene or a $C_3$ to $C_6$ α-olefin and an alkylstyrene comonomer, such as para-methylstyrene containing at least 80%, alternatively at least 90%, by weight of the para-isomer.

The copolymers may optionally include functionalized interpolymers wherein at least one or more of the alkyl substituents groups present in the styrene monomer units contain a halogen or some other functional group. In one embodiment, up to 60 mol % of the para-substituted styrene present in the random polymer structure may be functionalized. In another embodiment the amount of functionalized para-methylstyrene is in the range of 0.1 to 5 mol %, or in the range of 0.2 to 3 mol %. The functional group may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and cure are more particularly disclosed in U.S. Pat. No. 5,162,445, herein incorporated by reference.

In a further embodiment, the elastomer is a random copolymer of isobutylene and para-methylstyrene containing 0.5 to 20 mol % para-methylstyrene wherein up to 60 mol % of the methyl substituent groups present on the benzyl ring contain a bromine or chlorine atom, as well as acid or ester functionalized versions thereof.

In certain embodiments, the random copolymers have a substantially homogeneous compositional distribution such that at least 95% by weight of the polymer has a para-alkylstyrene content within 10% of the average para-alkylstyrene content of the polymer. Exemplary polymers are characterized by a narrow molecular weight distribution (Mw/Mn) of less than 5, alternatively less than 2.5, an exemplary viscosity average molecular weight in the range of 200,000 up to 2,000,000, and an exemplary number average molecular weight in the range of 25,000 to 750,000 as determined by gel permeation chromatography.

The elastomer may be a brominated poly(isobutylene-co-p-methylstyrene) ("BIMSM"). BIMSM polymers generally contain 0.1 to 5% mole of bromomethylstyrene groups relative to the total amount of monomer derived units in the copolymer. In one embodiment, the amount of bromomethyl groups is in the range of 0.2 to 3.0 mol %, or in the range of 0.3 to 2.8 mol %, or in the range of 0.4 to 2.5 mol %, or in the range of 0.3 to 2.0 mol %, wherein a desirable range may be any combination of any upper limit with any lower limit. Expressed another way, exemplary copolymers may contain 0.2 to 10 wt % of bromine, based on the weight of the polymer, or 0.4 to 6 wt % bromine, or 0.6 to 5.6 wt %, in another embodiment they are substantially free of ring halogen or halogen in the polymer backbone chain. In one embodiment, the random polymer is a copolymer of $C_4$ to $C_7$ isoolefin derived units (or isomonoolefin), para-methylstyrene derived units and para-(halomethylstyrene) derived units, wherein the para-(halomethylstyrene) units are present in the polymer in the range of 0.4 to 3.0 mol % based on the total number of para-methylstyrene, and wherein the para-methylstyrene derived units are present in the range of 3 to 15 wt % or in the range of 4 to 10 wt % based on the total weight of the polymer. In a preferred embodiment, the para-(halomethylstyrene) is para-(bromomethylstyrene).

Commercial embodiments of useful halogenated isobutylene-p-methylstyrene rubbers include the EXXPRO™ elastomers, available from ExxonMobil Chemical Company, Houston, Tex., having a Mooney viscosity (ML 1+8 at 125° C., ASTM D1646) in the range of 30 to 50, a p-methylstyrene content in the range of 4 to 8.5 wt %, and a bromine content in the range of 0.7 to 2.2 wt % relative to the halogenated isobutylene-p-methylstyrene rubber.

In a further embodiment, the elastomer may be at least one non isobutylene based rubber of types conventionally used in tire rubber compounding, and herein referred to as "general purpose rubber." A general purpose rubber may be any rubber that usually provides high strength and good abrasion along with low hysteresis and high resilience.

Examples of general purpose rubbers include natural rubber ("NR"), polyisoprene rubber ("IR"), poly(styrene-co-butadiene) rubber ("SBR"), polybutadiene rubber ("BR"), poly(isoprene-co-butadiene) rubber ("IBR"), styrene-isoprene-butadiene rubber ("SIBR"), and mixtures thereof. Ethylene-propylene rubber ("EP") and ethylene-propylene-diene rubber ("EPDM"), and their mixtures are also referred to as general purpose rubbers.

In one embodiment, the elastomer may include a polybutadiene rubber ("BR"). The Mooney viscosity of the polybutadiene rubber as measured at 100° C. (ML 1+4, ASTM D1646) may be in the range of 35 to 70, or 40 to about 65, or in the range of 45 to 60 in another embodiment. Another useful general purpose rubber is high cis-polybutadiene ("cis-BR"). By "cis-polybutadiene" or "high cis-polybutadiene", it is meant that 1,4-cis polybutadiene is used, wherein the amount of cis component is at least 90%.

The elastomer may be a polyisoprene (IR) rubber. The Mooney viscosity of the polyisoprene rubber as measured at 100° C. (ML 1+4, ASTM D1646) may be in the range of 35 to 70, or 40 to about 65, or in another embodiment in the range of 45 to 60.

The elastomeric composition may comprise rubbers of ethylene and propylene derived units such as EP and EPDM as suitable secondary elastomers. Examples of suitable comonomers in making EPDM are ethylidene norbornene, 1,4-hexadiene, dicyclopentadiene, as well as others. In one embodiment, the elastomeric composition may comprise an ethylene/alpha-olefin/diene terpolymer. The alpha-olefin may be selected from the group consisting of $C_3$ to $C_{20}$ alpha-olefin with propylene, with butene and octene being preferred and propylene most preferred. The diene component may be selected from the group consisting of $C_4$ to $C_{20}$ dienes.

In one embodiment, one or more elastomers may be a natural rubber. Desirable embodiments of natural rubbers may be selected from technically specified rubbers ("TSR"), such as Malaysian rubbers which include, but are not limited to, SMR CV, SMR 5, SMR 10, SMR 20, SMR 50, and mixtures thereof. Preferred natural rubbers have a Mooney viscosity at 100° C. (ML 1+4, ASTM D1646) in the range of 30 to 120, or in the range of 40 to 80.

The elastomers useful in this invention can be blended with various other rubbers or plastics, in particular thermoplastic resins such as nylons or polyolefins such as polypropylene or copolymers of polypropylene. These compositions are useful in air barriers such as bladders, tire innertubes, tire innerliners, air sleeves (such as in air shocks), diaphragms, as well as other applications where high air or oxygen retention is desirable.

In a preferred embodiment the elastomer is selected from poly(isobutylene-co-alkylstyrene), preferably poly(isobutylene-co-p-methylstyrene), halogenated poly(isobutylene-co-alkylstyrene), preferably halogenated poly(isobutylene-co-p-methylstyrene), star branched butyl rubber, halogenated star-branched butyl rubber, butyl rubber, halogenated butyl rubber, and mixtures thereof. In another preferred embodiment the elastomer comprises bromobutyl rubber or chlorobutyl rubber.

Polyalphaolefins

The elastomeric composition may include at least one polyalphaolefin ("PAO") component. In general, PAOs are oligomers of α-olefins (also known as 1-olefins) and are often used as the base stock for synthetic lubricants. PAOs are typically produced by the polymerization of alpha-olefins typically ranging from 1-octene to 1-dodecene, with 1-decene being a preferred material, although polymers of lower olefins such as ethylene and propylene may also be used, including copolymers of ethylene with higher olefins. The various grades of PAOs are mainly distinguished by their molecular weight or by their kinematic viscosity measured in centistokes (cSt). PAOs are Group 4 compounds, as defined by the American Petroleum Institute (API).

Useful PAOs may be made by any suitable means known in the art, and the invention is not herein limited by the method of producing the PAO. In one embodiment, the PAOs may be produced by the oligomerization or polymerization of alpha-olefins in the presence of a Friedel-Crafts (Lewis acid) catalyst, such as, for example, $AlCl_3$, $BF_3$, or a coordination complex such as ethylaluminum sesquichloride+$TiCl_4$. Alternatively, the PAO may be produced using a single-site coordination catalyst, such as a metallocene catalyst or a constrained geometry catalyst.

Subsequent to the polymerization, the PAO may be hydrogenated in order to reduce any residual unsaturation. Preferred PAOs are hydrogenated to yield substantially (>99 wt %) paraffinic materials.

The PAO's may also be functionalized to comprise, for example, esters, polyethers, polyalkylene glycols, and the like.

The PAOs are preferably oligomers (e.g., are dimers, trimers, tetramers, pentamers, etc.) of $C_4$ to $C_{24}$ α-olefins, $C_6$ to $C_{12}$ α-olefins, and/or $C_8$ to $C_{12}$ α-olefins. Suitable olefins include 1-butene, 1-pentene, 1-hexene, 1-heptene, 1-octene, 1-nonene, 1-decene, 1-undecene, and 1-dodecene. In a preferred embodiment, the α-olefin is 1-decene. Useful, PAOs are described more particularly in, for example, U.S. Pat. No. 5,171,908 and U.S. Pat. No. 5,783,531, both of which are herein incorporated by reference.

Useful PAOs may comprise $C_6$ to $C_{2000}$ paraffins, or $C_{15}$ to $C_{1500}$ paraffins, or $C_{40}$ to $C_{1000}$ paraffins, or $C_{50}$ to $C_{750}$ paraffins, or $C_{50}$ to $C_{500}$ paraffins with carbon numbers of $C_2$ to $C_{24}$, or $C_3$ to $C_{20}$, or $C_5$ to $C_{18}$, or $C_6$ to $C_{14}$, or $C_8$ to $C_{12}$.

In general, PAOs are high purity hydrocarbons with a fully paraffinic structure and a high-degree of side-chain branching. The PAO may have irregular branching or regular branching. The PAO may comprise oligomers or low molecular weight polymers of branched and/or linear alpha olefins.

In one embodiment, at least one of the alpha-olefins is a linear alpha-olefin (LAO); more preferably, all the alpha-olefins are LAOs. Preferred PAO's comprise linear alpha olefins having 5 to 18 carbon atoms, preferably 6 to 12 carbon atoms, more preferably 8 to 12 carbon atoms, still more preferably an average of about 10 carbon atoms. Suitable LAOs include ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, and blends thereof. Preferably, $C_2$, $C_3$, and $C_4$ alpha-olefins (i.e., ethylene, propylene and 1-butene and/or isobutylene) are present in the PAO oligomers at an average concentration of 30 wt % or less, or 20 wt % or less, or 10 wt % or less, or 5 wt % or less; more preferably, $C_2$, $C_3$, and $C_4$ alpha-olefins are not present in the PAO oligomers.

In one or more embodiments, the PAO comprises oligomers of two or more $C_2$ to $C_{24}$, or $C_3$ to $C_{20}$ LAOs, to make 'bipolymer' or 'terpolymer' or higher-order copolymer combinations. Other embodiments involve oligomerization of a mixture of LAOs selected from $C_6$ to $C_{18}$ LAOs with even carbon numbers, preferably a mixture of two or three LAOs selected from 1-hexene, 1-octene, 1-decene, and 1-dodecene.

The PAO or blend of PAOs may have a kinematic viscosity ("KV") at 100° C. (as measured by ASTM D445 at 100° C.) (1 cSt=1 mm²/s) of 3 cSt or more, or 4 cSt or more, or 5 cSt or more, or 6 cSt or more, or 8 cSt or more, or 10 cSt or more, or 20 cSt or more, or 30 cSt or more, or 40 cSt or more, or 80 cSt or more, or 100 cSt or more, or 200 cSt or more, or 500 cSt or more, or 750 or more, or 1000 cSt or more. In some embodiments, the PAO has a KV at 100° C. in the range of 3 to 3,000 cSt, or 4 to 1,000 cSt, preferably 6 to 300 cSt, or 6 to 150 cSt, or 8 to 150 cSt, or 8 to 100 cSt, or 8 to 40 cSt. In other embodiments, the PAO or blend of PAOs has a KV100° C. in the range of 3 cSt to 20 cSt, or in the range of 5 cSt to 15 cSt, or preferably in the range of 6 cSt to 10 cSt. In further embodiments, the PAO or blend of PAOs has a KV100° C. in the range of 40 to 200 cSt, or in the range of 60 to 150 cSt, or preferably 80 cSt to 120 cSt.

The PAO or blend of PAO may have a viscosity index ("VI"), as determined by ASTM D-2270, of 90 or more, or 100 or more, or 110 or more, or 115 or more, or 120 or more, or 130 or more, or 140 or more, or 150 or more, or 170 or more, or 200 or more, or 250 or more, or 300 or more. Preferred ranges for VI include 90 to 400, or in the range of 120 to 350, or 130 to 250, or 100 to 180, or preferably 110 to 150, or more preferably 120 to 140.

Conventional PAOs with KV at 100° C. of 10 cSt or less generally have a VI of less than 150. A PAO with a high VI can be advantageous because for a given viscosity at room temperature, a higher VI means the PAO has a higher viscosity at high temperature where polymer processing takes place (e.g., 200° C.), so blending the PAO into the polymer is facilitated (it is well known that homogeneous mixing of materials with severely mismatched viscosities such as a high viscosity polymer and a low viscosity fluid is difficult). On the other hand, for a given viscosity at high temperature (e.g., 200° C.), a higher VI means the PAO has a lower viscosity at room temperature, so the PAO is easier to pump. In certain embodiments, the PAO or blend of PAOs has a KV100° C. of 10 cSt or less and a VI of 150 or more. In other embodiments, the PAO or blend of PAOs has a KV100° C. of 150 cSt or less, preferably between 10 and 150 cSt, and a VI of greater than 105 (KV100° C.)$^{0.13}$ where KV100° C. is measured in cSt.

Useful PAOs typically possess a number average molecular weight (Mn) in the range of 100 to 21,000, or 300 to 15,000, or in the range of 200 to 10,000, or 200 to 7,000, or 600 to 3,000, or more preferably 200 to 2,000, or more preferably 200-500 g/mole.

Useful PAOs have a weight average molecular weight (Mw) of less than 20,000 g/mol, or less than 10,000 g/mol, or less than 5,000 g/mol, or more preferably less than 4,000 g/mol, or less than 2,000 g/mol, or less than 500 g/mol. In some embodiments, the PAO may have a Mw of 1000 g/mole or more, or 2000 g/mole or more, or 2500 g/mole or more, or 3000 g/mole or more, or 3500 g/mole or more. In other embodiments the PAO may have a Mw in the range of 100 to 20,000 g/mol, or 200 to 10,000 g/mol, or 200 to 7,000 g/mol. In another embodiment, the PAO may have a Mw in the range of 2000 g/mole to 4000 g/mole, or in the range of 2500 g/mole to 3500 g/mole.

In one or more embodiments, the PAO or blend of PAOs has a molecular weight distribution as characterized by the ratio of the weight- and number-averaged molecular weights ($M_w/M_n$) of 4 or less, or 3 or less, or 2.5 or less, or 2.3 or less, or 2.1 or less, or 2.0 or less, or 1.9 or less, or 1.8 or less. In other embodiments, the PAO or blend of PAOs has a $M_w/M_n$ in the range of 1 to 2.5, preferably 1.1 to 2.3, or 1.1 to 2.1, or 1.1 to 1.9.

Preferably the PAO has a pour point, as determined by ASTM D97) of less than 0° C., or –5° C. or less, or preferably –10° C. or less, more preferably –20° C. or less, or –30° C. or less, or –40° C. or less, or –50° C. or less, or in the range of –20 to –80° C., or –30 to –70° C.

The PAO may have a dielectric constant, as measured by ASTM D 924, at 20° C. of less than 3.0, preferably less than 2.8, more preferably less than 2.5, more preferably less than 2.3, still more preferably less than 2.1.

Useful PAOs may have a specific gravity (ASTM D 4052, 15.6° C.) of less than 0.920, or less than 0.910, or less than 0.86, or less than 0.855, or less than 0.85, or more preferably in the range of 0.650 to 0.900, or 0.700 to 0.860, or 0.750 to 0.855, or 0.790 to 0.850, or 0.800 to 0.840.

The PAO may have a boiling point in the range of 100° C. to 500° C., or in the range of 200° C. to 450° C., or in the range of 250° C. to 400° C.

Particularly preferred PAO's for use here in are those having a flash point as measured by the open cup method (ASTM-D92) of 200° C. or more, preferably 220° C. or more, preferably 230° C. or more, or 250° C. or more, with suitable ranges of flash point falling in the range of about 140°-300° C., or in the range of about 160°-300° C., or in the range of about 175° C.-300° C., or preferably in the range of about 200° C.-275° C., or in the range of about 210-275° C., or in the range of about 210° C.-250° C.

Particularly preferred PAO's for use here in are those having a flash point of 200° C. or more (preferably 220° C. or more, or 230° C. or more, or 250° C. or more) and a pour point less than –25° C. (preferably less than –30° C., or less than –35° C., or less than –40° C.).

In one or more embodiments, the PAO or blend of PAOs has a glass transition temperature ($T_g$) of –40° C. or less, or –50° C. or less, or –60° C. or less, or –70° C. or less, or –80° C. or less, preferably –50 to –120° C., or –60 to –100° C., or –70 to –90° C.

In a preferred embodiment, the PAO comprises $C_6$ to $C_{14}$ olefins having a kinematic viscosity of 10 cSt or more at 100° C., and a viscosity index of 120 or more, preferably 130 or more, as determined by ASTM D-2270.

Particularly advantageous PAOs and blends of PAOs are those having a) a flash point of 200° C. or more, preferably 210° C. or more, or 220° C. or more, or 230° C. or more; and b) a pour point less than –20° C., preferably less than –25° C., or less than –30° C., or less than –35° C., or less than –40° C. and/or c) a KV100° C. of 10 cSt or more, preferably 35 cSt or more, or 40 cSt or more, or 60 cSt or more.

Further advantageous PAOs or blends of PAOs have a) a KV100° C. of at least 3 cSt, preferably at least 4 cSt, or at least 6 cSt, or at least 8 cSt, or at least 10 cSt; b) a VI of at least 120, preferably at least 130, or at least 140, or at least 150; c) a pour point of –10° C. or less, preferably –20° C. or less, or –30° C. or less, or –40° C. or less; and d) a specific gravity (15.6° C.) of 0.86 or less preferably 0.855 or less, or 0.85 or less, or 0.84 or less.

The PAO component may be a blend or mixture of one or more distinct PAOs with different compositions and/or different physical properties (e.g., kinematic viscosity, pour point, and/or viscosity index).

Advantageous blends of PAOs include blends of two or more PAOs where the ratio of the highest KV100° C. to the lowest KV100° C. is at least 1.5, preferably at least 2, or at least 3, or at least 5. Advantageous blends of PAO also include blends of two or more PAOs where: at least one PAO has a KV100° C. of 300 cSt or more and at least one PAO has a KV100° C. of less than 300 cSt; or at least one PAO has a KV100° C. of 150 cSt or more and at least one PAO has a KV100° C. of less than 150 cSt; or at least one PAO has a KV100° C. of 100 cSt or more and at least one PAO has a KV100° C. of less than 100 cSt; or at least one PAO has a KV100° C. of 40 cSt or more and at least one PAO has a KV100° C. of less than 40 cSt; or at least one PAO has a KV100° C. of 10 cSt or more and at least one PAO has a KV100° C. of less than 10 cSt.

When a PAO or combination of more than one PAOs is employed, it is preferred that the PAO or combination of PAOs have a pour point less than or equal to −38° C. and/or a Kinematic viscosity less than or equal to 10.5 mm²/s at 100° C. Such formulations may include a PAO having one or more of the properties described herein and another PAO with properties that may or may not have one or more of the properties described herein as long as the combination of PAOs have a pour point less than or equal to −38° C. and/or a Kinematic viscosity less than or equal to 10.5 mm²/s at 100° C.

Hydrocarbon Polymer Additive

The elastomeric composition may further comprise a hydrocarbon polymer additive ("HPA"). HPAs are generally derived from petroleum streams, and may be hydrogenated or non-hydrogenated resins. Useful HPAs include, but are not limited to, aliphatic HPAs, aromatic modified aliphatic HPAs, aliphatic/aromatic resins, polycyclic resins, hydrogenated polycyclic resins, hydrogenated polycyclic aromatic resins, hydrogenated aromatic resins in which a substantial portion of the benzene rings are converted to cyclohexane rings, gum rosins, gum rosin esters, wood rosins, wood rosin esters, tall oil rosins, tall oil rosin esters, polyterpenes, aromatic modified polyterpenes, terpene phenolics, and combinations thereof.

The HPA may be used as an elastomer compounding material. Depending on how the HPA is compounded, optimization of rubber characteristics for rubber and tire durability, traction, and abrasion resistance can be achieved. For example, naphthenic oil is normally added to a tire innerliner compound formulation to ensure adequate processing qualities of the compound in a tire production factory. However, naphthenic oil has a detrimental effect by increasing innerliner permeability. Use of HPAs in place of naphthenic oil may allow for maintenance of compound processing characteristics such as Mooney viscosity while simultaneously improving innerliner impermeability. Replacement of naphthenic process oil with HPA may allow maintenance of innerliner compound factory processing qualities and thus enable improvements in other properties such as, but not limited to, fatigue resistance, durability, and/or impermeability.

The properties (molecular weight, molecular weight distribution, glass transition temperature, branching, etc.) of the HPA may be manipulated by varying the feedstock from which the HPA is derived. The HPA may be produced from a variety of feedstocks; for example, in some embodiments a major component of the feedstock may be piperylene, while in other embodiments cyclopentadiene may be a main component, and in further embodiments, distillates containing vinyltoluenes and indene may be the main components.

The properties of the HPA are also affected by the microstructure of the resin, i.e., the type and amount of monomer components. Monomer placement in the resin chain is random leading to further complexity in the polymer microstructure. For example, some resins may contain aliphatic hydrocarbon components which have a hydrocarbon chain formed from $C_4$-$C_6$ fractions containing variable quantities of piperylene, isoprene, mono-olefins, and non-polymerizable paraffinic compounds. Such HPAs may be based on pentene, butane, isoprene, piperylene, and generally contain reduced quantities of cyclopentadiene and dicyclopentadiene. The HPA may also contain aromatic hydrocarbon structures having polymeric chains which are formed of aromatic units, such as styrene, xylene, α-methylstyrene, vinyl toluene, and indene. Other HPAs may comprise primarily cyclopentadiene and/or dicyclopentadiene.

The HPA may contain "aliphatic" and/or "aromatic" components. Preferred aliphatic olefins are $C_4$ to $C_{20}$, preferably $C_4$ to $C_7$, even more preferably $C_5$ to $C_6$, linear, branched, or alicyclic olefins or non-conjugated diolefins. Preferred aromatic olefins include one or more of styrene, indene, derivatives of styrene and derivatives of indene. Particularly preferred aromatic olefins include styrene, alpha-methylstyrene, beta-methylstyrene, indene and methylindenes, and vinyl toluenes. In preferred embodiments, the HPA comprises monomers derived from piperylene, isoprene, amylene, cyclics, styrene, indene, or combinations thereof.

Piperylenes are generally a distillate cut or synthetic mixture of $C_5$ diolefins, which include, but are not limited to, cis-1,3-pentadiene, trans-1,3-pentadiene, and mixed 1,3-pentadiene. In general, piperylenes do not include branched $C_5$ diolefins such as isoprene.

Cyclics are generally a distillate cut or synthetic mixture of $C_5$ and $C_6$ cyclic olefins, diolefins, and dimers therefrom. Cyclics include, but are not limited to, cyclopentene, cyclopentadiene ("CPD"), dicyclopentadiene ("DCPD"), cyclohexene, 1,3-cyclohexadiene, and 1,4-cyclohexadiene. The term dicyclopentadiene is defined to include both the endo and exo forms of DCPD. A preferred cyclic is cyclopentadiene. The cyclic may be substituted; preferred substituted cyclics include CPDs and DCPDs substituted with a C1 to C40 linear, branched, or cyclic alkyl group, preferably one or more methyl groups. Methylcyclopentadiene is a preferred substituted cyclopentadiene.

The HPA may include one or more styrenic components, such as styrene, derivatives of styrene, and substituted styrenes. In general, styrenic components do not include fused-rings, such as indene.

The HPA may include one or more indenic components, such as indene and derivatives of indene.

In some embodiments, styrenic components may tend to lower the HPA's softening point. Other aromatics (especially indenics) may tend to increase the HPA's softening point. In other embodiments, the HPA may include CPD and DCPD which tend to have a broadening effect on molecular weight distribution and tend to increase the HPA's softening point.

The HPA may be produced by methods generally known in the art for the production of hydrocarbon resins. For example, in some embodiments the HPA is produced by thermal polymerization, while in other embodiments the HPA may be produced by catalytic polymerization. The polymerization and stripping conditions may be adjusted according to the nature of the feed to obtain the desired resin.

In one embodiment, the HPA may be prepared by thermal polymerization. For example, the resin may be thermally polymerized from a feed containing cyclopentadiene in a benzene or toluene solvent for 2.0 to 4.0 hours at 220° C. to 280° C. and about 14 bars pressure (1.4 MPa), with conditions being adjusted to control the molecular weight and softening point of the resin. The feed may further contain alkyl cyclopentadienes, dimers and codimers of cyclopentadiene and methylcyclopentadiene, and other acyclic dienes such as 1,3-piperylene and isoprene. Other copolymerizable unsaturated monomers such as vinyl aromatics such as styrene, α-methylstyrene, indene, and vinyl toluene may also be present.

In another embodiment, the HPA may be catalytically polymerized. A preferred method for production of the resins is combining the feed stream in a polymerization reactor with a Friedel-Crafts or Lewis Acid catalyst at a temperature in the range of 0° C. and 200° C., preferably in the range of 20° C.

and 80° C. Friedel-Crafts polymerization is generally accomplished by use of known catalysts in a polymerization solvent, and removal of solvent and catalyst by washing and distillation. The polymerization process may be in a batchwise or continuous mode, continuous polymerization may be in a single stage or in multiple stages. The Friedel-Crafts catalysts that may be used include, but are not limited to, Lewis Acids such as boron triflouride (BF3), complexes of boron triflouride, aluminum trichloride (AlCl3), or alkyl-aluminum halides, particularly chloride. In an embodiment, the amount of Lewis Acid that may be used in the catalyst is in the range of 0.3 to 3.0 wt %, based upon the weight of the feed blend, preferably 0.5 to 1.0 wt %. The aluminum trichloride catalyst is preferably used as a powder.

In a preferred embodiment the resins may be hydrogenated. Any known process for catalytically hydrogenating resins may be used to hydrogenate the resin. The hydrogenation of hydrocarbon resins may be carried out via molten or solution based processes by either a batchwise or, more commonly, a continuous process. Catalysts employed for the hydrogenation of HPAs are typically supported monometallic and bimetallic catalyst systems. The catalysts which may be used may include Group VIII metals such as nickel, palladium, ruthenium, rhodium, cobalt, and platinum, Group VI metals such as tungsten, chromium, and molybdenum, Group VII metals such as rhenium, manganese, and copper, other catalysts may be based on group 9, 10, or 11 elements. These metals may be used singularly or in combination of two or more metals, in the metallic form or in an activated form and may be used directly or carried on a solid support such as alumina or silica-alumina. The support material typically comprises porous inorganic refractory oxides such as silica, magnesia, silica-magnesia, zirconia, silica-zirconia, titanic silica-titania, alumina, silica-aluminum alumino-silicate, etc. Preferably, the supports are essentially free of crystalline molecular sieve materials. Mixtures of the foregoing oxides are also contemplated, especially when prepared as homogeneously as possible. Preferred supports include alumina, silica, carbon, MgO, TiO2, ZrO2, FeO3, or mixtures thereof.

The HPA may be polar or non-polar. "Non-polar" means that the HPA is substantially free of monomers having polar groups. Preferably the polar groups are not present, however if they are, preferably they are not present at more that 5 weight %, preferably not more that 2 weight %, even more preferably no more than 0.5 weight %.

Examples of commercially available HPAs include: OPPERRA™ 373, 394, 103 all available from ExxonMobil Chemical Company.

In one embodiment, the HPA has a melt viscosity in the range of 300 to 800 centipoise (cPs) at 160° C., or more preferably 350 to 650 cPs at 160° C. In a preferred embodiment, the HPA's melt viscosity is in the range of 375 to 615 cPs at 160° C., or in the range of 475 to 600 cPs at 160° C. The melt viscosity may be measured by a Brookfield viscometer with a type "J" spindle, ASTM D6267.

In other embodiments, the HPAs have a weight average molecular weight (Mw) greater than about 600 g/mole or greater than about 1000 g/mole. In at least one embodiment, HPAs have a weight average molecular weight (Mw) in the range of 1650 to 1950 g/mole, or 1700 to 1900 g/mole. Preferably HPA's have a weight average molecular weight in the range of 1725 to 1890 g/mole. The HPA may have a number average molecular weight (Mn) in the range of 450 to 700 g/mole, or 500 to 675 g/mole, or preferably in the range of 520 to 650 g/mole. The HPA may have a z-average molecular weight (Mz) in the range of 5850 to 8150 g/mole, or more preferably in the range of 6000 to 8000 g/mole. Mw, Mn, and Mz may be determined by gel permeation chromatography (GPC).

In one embodiment the HPA has a polydispersion index ("PDI", PDI=Mw/Mn) of 4 or less. In a preferred embodiment the HPA has a PDI in the range of 2.6 to 3.1.

In some embodiments, HPAs have a glass transition temperature (Tg) in the range of about −30° C. to about 100° C., or about 0° C. to about 80° C., or about 40° C. to about 60° C., or about 45° C. to about 55° C., or preferably in the range of about 48° C. to about 53° C. Differential scanning calorimetry (DSC) may be used to determine the HPA's Tg. The procedure for Differential Scanning Calorimetry ("DSC") is described as follows. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a Differential Scanning Calorimeter ("DSC") (Perkin Elmer Pyris One Thermal Analysis System) and cooled to about −50° C. to about −70° C. The sample is heated at 10° C./min to attain a final temperature of about 200° C. The sample is kept at 200° C. for 5 minutes and a second cool-heat cycle is performed. Events from both cycles are recorded. The thermal output is recorded as the area under the melting peak of the sample, which typically occurs between about 0° C. and about 200° C. The total energy absorbed or released by the sample during the testing procedure is the ΔH, which is expressed as Joules per gram of polymer. The melting point is recorded as the temperature of the greatest heat absorption with respect to a baseline within the range of the melting of the sample.

In one or more embodiments, HPAs have a Mn of at least 400, a Mw of at least 500, a Z average molecular weight (Mz) of at least 700, and a polydispersity (Mw/Mn) of at least 1.5, where Mn, Mw, and Mz are determined by Gel Permeation Chromatography. Similarly, the resin has a Mn up to 2000, a Mw of up to 3500, a Mz of up to 15,000, and a polydispersity (Mw/Mn) up to 4.

In one embodiment the resin has a ring and ball softening point in the range of 10° C. to 140° C., preferably 80° C. to 120° C., as measured by ASTM E28-99. In another embodiment, the resin has a weight average molecular weight (Mw) of 4000 or less, preferably in the range of 500 and 4000, preferably in the range of 500 to 2500. In another embodiment, the resin has a Mw/Mn of 3 or less, preferably in the range of 1 and 2.4, or in the range of 1 and 2.

The HPA may contain varying amounts of one or more of piperylene, cyclics, isoprene, amylene, indenic components, and/or styrenic components.

In one embodiment, the HPA comprises 40 to 90 wt % piperylene, or from 50 to 90 wt %, or more preferably from 60 to 90 wt %. In another embodiment, the HPA comprises from 70 to 90 wt % piperylene.

In some embodiments, the HPA is substantially free of isoprene. In other embodiments, the HPA contains up to 5 wt % isoprene, or more preferably up to 10 wt % isoprene. In yet another embodiment, the HPA contains up to 15 wt % isoprene.

In some embodiments, the HPA is substantially free of amylene. In other embodiments, the HPA contains up to 10 wt % amylene, or up to 25 wt % amylene, or up to 30 wt % amylene. In yet another embodiment, the HPA contains up to 40 wt % amylene.

In some embodiments, aromatic olefins are typically present in the HPA from 5 to 45 wt %, or more preferably from 5 to 30 wt %. In preferred embodiments, the HPA comprises from 10 to 20 wt % aromatic olefins.

In one embodiment, the HPA comprises up to 60 wt % styrenic components or up to 50 wt % styrenic components. In one embodiment, the HPA comprises from 5 to 30 wt % styrenic components, or from 5 to 20 wt % styrenic components. In a preferred embodiment, the HPA comprises from 10 to 15 wt % styrenic components.

In another embodiment, the HPA may include up to 15 wt % indenic components, or up to 10 wt % indenic components. Indenic components include indene and derivatives of indene. In one embodiment, the HPA comprises up to 5 wt % indenic components. In another embodiment, the HPA is substantially free of indenic components.

In one embodiment the HPA may include up to 60 wt % cyclics or up to 50 wt % cyclics. In some embodiments, the HPA includes cyclics in an amount in the range of about 0.1 wt % to about 50 wt %, or about 0.5 wt % to about 30 wt % cyclics, or about 1.0 wt % to about 20 wt % cyclics are included. In other embodiments, the HPA comprises from about 5 wt % to about 15 wt % cyclics.

In other preferred embodiments, the HPA may comprise greater than 75 wt % of cyclics, or greater than 80 wt %, or greater than 90 wt % cyclics. In some embodiments, the HPA may consist essentially of cyclics.

In another embodiment, the HPA contains dicyclopentadiene ("DCPD") and methyl substituted DCPD isomers which are polymerized thermally and then hydrogenated to remove any unsaturated double bonds. The HPA has a compact and rigid "ladder like" structure with some carbon-carbon branches. The HPA has a softening point of about 120° C. and a Tg of about 70° C.

In a particularly preferred embodiment, the HPA comprises dicyclopentadiene or substituted dicyclopentadiene. The preferred HPA has a Mn of about 410, a Mw of about 630, and a Mz of about 1020. The resin may have a softening point in the range of about 115 to about 130° C., as measured by ASTM E28-99.

In one embodiment, the HPA may comprise 50-90 wt % piperylene, 0-5 wt % isoprene, 10-30 wt % amylene, 0-5 wt % cyclics, 0-10 wt % styrenic components, and 0-10 wt % indenic components. The resin may have a melt viscosity at 160° C. of from 375 cPs to 515 cPs, a Mn of 700-900 g/mole, a Mw of 1400-1800 g/mole, a Mz of 3000-5000 g/mole, and a Tg of 45° C. to 50° C.

In another embodiment, the HPA may comprise 60-90 wt % piperylene, 0-5 wt % isoprene, 0-10 wt % amylene, 5-15 wt % cyclics, 5-20 wt % styrenic components, and 0-5 wt % indenic components. The resin may have a melt viscosity at 160° C. of from 375 cPs to 615 cPs, a Mn of 520-650 g/mole, a Mw of 1725-1890 g/mole, a Mz of 6000-8200 g/mole, and a Tg of 48° C. to 53° C.

In yet another embodiment, the HPA may comprise dicyclopentadiene and methyl substituted dicyclopentadiene. The resin may have a softening point of from about 115° C. to 130° C. as measured by ASTM E28-99, a Tg of about 70° C., a Mn of about 410 g/mole, a Mw of about 630 g/mole, and a Mz of about 1020 g/mole.

In a further embodiment, the HPA may consist essentially of cyclics, such as dicyclopentadiene and substituted dicyclopentadiene. The resin may have a softening point in the range of about 115° C. to 130° C. as measured by ASTM E28-99, a Tg of about 70° C., a Mn of about 410 g/mole, a Mw of about 630 g/mole, and a Mz of about 1020 g/mole.

Fillers and Additives

The elastomeric compositions may also contain other components and additives customarily used in rubber compounds, such as, for example, effective amounts of other processing aids, pigments, accelerators, cross-linking and curing materials, antioxidants, antiozonants, fillers, and/or clays. In addition to PAO and/or a HPA the elastomeric compositions may optionally include other useful processing aids such as, for example, plastomers, polybutenes, or mixtures thereof.

In addition to comprising at least one elastomer, the elastomeric compositions may also optionally comprise at least one filler, for example, calcium carbonate, clay, mica, silica, silicates, talc, titanium dioxide, aluminum oxide, zinc oxide, starch, wood flour, carbon black, or mixtures thereof. The fillers may be any size and typically are in the range of about 0.0001 μm to about 100 μm, for example in the tire industry.

As used herein, silica is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica.

The elastomeric composition may also include clay. The clay may be, for example, montmorillonite, nontronite, beidellite, vokoskoite, laponite, hectorite, saponite, sauconite, magadite, kenyaite, stevensite, vermiculite, halloysite, aluminate oxides, hydrotalcite, or mixtures thereof, optionally, treated with modifying agents. The clay may contain at least one silicate. Alternatively, the filler may be a layered clay, optionally, treated or pre-treated with a modifying agent such as organic molecules; the layered clay may comprise at least one silicate.

The elastomeric compositions may incorporate a clay, optionally, treated or pre-treated with a modifying agent, to form a nanocomposite or nanocomposite composition. Nanocomposites may include at least one elastomer as described above and at least one modified layered filler. The modified layered filler may be produced by the process comprising contacting at least one layered filler such as at least one layered clay with at least one modifying agent.

In one embodiment, the layered filler such as a layered clay may comprise at least one silicate. The silicate may comprise at least one "smectite" or "smectite-type clay" referring to the general class of clay minerals with expanding crystal lattices. For example, this may include the dioctahedral smectites which consist of montmorillonite, beidellite, and nontronite, and the trioctahedral smectites, which includes saponite, hectorite, and sauconite. Also encompassed are synthetically prepared smectite-clays, for example those produced by hydrothermal processes.

The silicate may comprise natural or synthetic phyllosilicates, such as montmorillonite, nontronite, beidellite, bentonite, volkonskoite, laponite, hectorite, saponite, sauconite, magadite, kenyaite, stevensite, and the like, as well as vermiculite, halloysite, aluminate oxides, hydrotalcite, and the like. Combinations of any of the above discussed silicates are also contemplated.

The layered filler such as the layered clays described above may be modified such as intercalated or exfoliated by treatment with at least one modifying agent. Modifying agents are also known as swelling or exfoliating agents. Generally, they are additives capable of undergoing ion exchange reactions with the cations present at the interlayer surfaces of the layered filler. The modifying agent may be present in the composition in an amount to achieve optimal air retention as measured by the permeability testing. For example, the additive may be employed in the range of 0.1 to 40 phr in one embodiment, and in the range of 0.2 to 20 phr in another embodiment, and in the range of 0.3 to 10 phr in yet another embodiment.

The modifying agent may be added as an additive to the composition at any stage; for example, the additive may be added to the elastomer, followed by addition of the layered filler, or may be added to a combination of at least one elastomer and at least one layered filler; or may be added to a combination of at least one elastomer and at least one layered filler; or the additive may be first blended with the layered filler, followed by addition of the elastomer in yet another embodiment.

Examples of suitable exfoliating additives include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides.

For example, amine compounds (or the corresponding ammonium ion) are those with the structure $R^2R^3R^4N$, wherein $R^2$, $R^3$, and $R^4$ are $C_1$ to $C_{30}$ alkyls or $C_2$ to $C_{30}$ alkenes in one embodiment, $C_1$ to $C_{20}$ alkyls or $C_2$ to $C_{20}$ alkenes in another embodiment, which may be the same or different. In one embodiment, the exfoliating agent is a so-called long chain tertiary amine, wherein at least $R^2$ is a $C_{14}$ to $C_{20}$ alkyl or alkene.

In other embodiments, a class of exfoliating additives includes those which can be covalently bonded to the interlayer surfaces. These include polysilanes of the structure —$Si(R^5)_2R^6$ where $R^5$ is the same or different at each occurrence and is selected from alkyl, alkoxy or oxysilane and $R^6$ is an organic radical compatible with the matrix polymer of the composite. Other suitable exfoliating additives include protonated amino acids and salts thereof containing 2-30 carbon atoms such as 12-aminododecanoic acid, epsilon-caprolactam and like materials.

In an embodiment, the exfoliating additive or additives are capable of reacting with the halogen sites of the halogenated elastomer to form complexes which help exfoliate the clay. In certain embodiments, the additives include all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate.

In yet other embodiments, modifying agents include at least one polymer chain comprising a carbon chain length of from $C_{25}$ to $C_{500}$, wherein the polymer chain also comprises an ammonium-functionalized group described by the following group pendant to the polymer chain E:

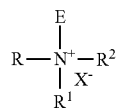

wherein each R, $R^1$ and $R^2$ are the same or different and independently selected from hydrogen, $C_1$ to $C_{26}$ alkyl, alkenes or aryls, substituted $C_1$ to $C_{26}$ alkyls, alkenes or aryls, $C_1$ to $C_{26}$ aliphatic alcohols or ethers, $C_1$ to $C_{26}$ carboxylic acids, nitriles, ethoxylated amines, acrylates and esters; and wherein X is a counterion of ammonium such as Br−, Cl− or $PF_6^-$.

The amount of clay or exfoliated clay incorporated in the nanocomposites is generally that which is sufficient to develop an improvement in the mechanical properties or barrier properties of the nanocomposite, for example, tensile strength or oxygen permeability. Amounts generally will be in the range of 0.5 to 10 wt % in one embodiment, and in the range of 1 to 5 wt % in another embodiment, based on the polymer content of the nanocomposite. Expressed in parts per hundred rubber, the clay or exfoliated clay may be present in the range of 1 to 30 phr in one embodiment, and in the range of 5 to 20 phr in another embodiment.

In one embodiment, one or more silane coupling agents are used in the elastomeric compositions. Coupling agents are particularly desirable when silica is the primary filler, or is present in combination with another filler, as they help bind the silica to the elastomer. The coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl, triethoxysilane, gammamercaptopropyltrimethoxysilane, and the like, and mixtures thereof.

The filler may be carbon black or modified carbon black. The filler may also be a blend of carbon black and silica. In one embodiment, the elastomeric composition comprises reinforcing grade carbon black at a level in the range of 10 to 100 phr of the blend, more preferably in the range of 30 to 80 phr in another embodiment, and in yet another embodiment in the range of 50 to 80 phr. Useful grades of carbon black include the ranges of from N110 to N990, preferably N660.

Crosslinking Agents, Curatives, Cure Packages, and Curing Processes

The elastomeric compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry.

Generally, polymer blends are crosslinked to improve the polymer's mechanical properties. Physical properties, performance characteristics, and durability of vulcanized rubber compounds are known to be related to the number (crosslink density) and type of crosslinks formed during the vulcanization reaction. Polymer blends may be crosslinked by adding curative agents, for example sulfur, metals, metal oxides such as zinc oxide, peroxides, organometallic compounds, radical initiators, fatty acids, and other agents common in the art. Other known methods of curing that may be used include, peroxide cure systems, resin cure systems, and heat or radiation-induced crosslinking of polymers. Accelerators, activators, and retarders may also be used in the curing process.

The compositions may be vulcanized (cured) by any suitable means, such as subjecting them to heat or radiation according to any conventional vulcanization process. The amount of heat or radiation needed is that which is required to affect a cure in the composition, and the invention is not herein limited by the method and amount of heat required to cure the composition. Typically, the vulcanization is conducted at a temperature ranging from about 100° C. to about 250° C. in one embodiment, from 150° C. to 190° C. in another embodiment, for about 1 to 150 minutes.

Halogen-containing elastomers may be crosslinked by their reaction with metal oxides. The metal oxide is thought to react with halogen groups in the polymer to produce an active intermediate which then reacts further to produce carbon-carbon bonds. Zinc halide is liberated as a by-product and it serves as an autocatalyst for this reaction. The metal oxide can be used alone or in conjunction with its corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof.

Sulfur is the most common chemical vulcanizing agent for diene-containing elastomers. It exists as a rhombic 8-member ring or in amorphous polymeric forms. The sulfur vulcanization system may consist of an activator to activate the sulfur, an accelerator, and a retarder to help control the rate of vulcanization. Activators are chemicals that increase the rate of vulcanization by reacting first with the accelerators to form rubber-soluble complexes which then react with the sulfur to form sulfurating agents. General classes of accelerators include amines, diamines, guanidines, thioureas, thiazoles, thiurams, sulfenamides, sulfenimides, thiocarbamates, xanthates, and the like.

Accelerators help control the onset of and rate of vulcanization, and the number and type of crosslinks that are formed. Retarders may be used to delay the initial onset of cure in order to allow sufficient time to process the unvulcanized rubber.

The acceleration of the vulcanization process may be controlled by regulating the amount of the acceleration accelerant, often an organic compound. The mechanism for accelerated vulcanization of natural rubber, BR, and SBR involves complex interactions between the curative, accelerator, activators, and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), benzothiazyl disulfide (MBTS), N-tertiarybutyl-2-benzothiazole sulfenamide (TBBS), N-cyclohexyl-2-benzothiazole-sulfenamide (CBS), and thioureas.

In one embodiment, at least one curing agent(s) is present in the range of 0.2 to 10 phr, or 0.5 to 5 phr, or in another embodiment in the range of 0.75 phr to 2 phr.

Processing

The elastomeric composition may be compounded (mixed) by any conventional means known to those skilled in the art. The mixing may occur in a single step or in multiple stages. For example, the ingredients are typically mixed in at least two stages, namely at least one non-productive stage followed by a productive mixing stage. The final curatives are typically mixed in the final stage which is conventionally called the "productive" mix stage. In the productive mix stage the mixing typically occurs at a temperature, or ultimate temperature, lower than the mix temperature(s) of the preceding non-productive mix stage(s). The elastomers, polymer additives, silica and silica coupler, and carbon black, if used, are generally mixed in one or more non-productive mix stages. The terms "non-productive" and "productive" mix stages are well known to those having skill in the rubber mixing art.

In one embodiment, the carbon black is added in a different stage from zinc oxide and other cure activators and accelerators. In another embodiment, antioxidants, antiozonants, and processing materials are added in a stage after the carbon black has been processed with the elastomers, and zinc oxide is added at a final stage to maximize the compound modulus.

In other embodiments, additional stages may involve incremental additions of one or more fillers.

In another embodiment, mixing of the components may be carried out by combining the elastomer components, filler and clay in any suitable mixing device such as a two-roll open mill, Brabender™ internal mixer, Banbury™ internal mixer with tangential rotors, Krupp internal mixer with intermeshing rotors, or preferably a mixer/extruder, by techniques known in the art. Mixing may be performed at temperatures up to the melting point of the elastomer(s) used in the composition in one embodiment, or from 40° C. to 250° C. in another embodiment, or from 100° C. to 200° C. in yet another embodiment. Mixing should generally be conducted under conditions of shear sufficient to allow the clay to exfoliate and become uniformly dispersed within the elastomer(s) to form the nanocomposite.

Typically, from 70% to 100% of the elastomer or elastomers is first mixed for 20 to 90 seconds, or until the temperature reaches from 40° C. to 75° C. Then, approximately 75% of the filler, and the remaining amount of elastomer, if any, is typically added to the mixer, and mixing continues until the temperature reaches from 90° C. to 150° C. Next, the remaining filler is added, as well as the processing aids, and mixing continues until the temperature reaches from 140° C. to 190° C. The masterbatch mixture is then finished by sheeting on an open mill and allowed to cool, for example, to from 60° C. to 100° C. when curatives may be added.

Mixing with the clays is performed by techniques known to those skilled in the art, wherein the clay is added to the polymer at the same time as the carbon black in one embodiment. The PAO and/or HPA processing aid is typically added later in the mixing cycle after the carbon black and clay have achieved adequate dispersion in the elastomeric matrix.

The cured compositions can include various elastomers and fillers with the PAO and/or HPA processing aid. The elastomeric compositions typically include $C_4$ to $C_7$ monoolefin elastomers, such as isobutylene-based elastomers, preferably halogenated poly(isobutylene-co-p-methylstyrene), butyl rubber, or halogenated star-branched butyl rubber (HSBB), with the PAO(s) being present in the range of 2 to 40 phr in one embodiment, or 4 to 30 phr, or 4 to 15 phr in another embodiment, and HPA(s) being present in the range of 5 to 50 phr in one embodiment, or 10 to 40 phr, or 10 to 30 phr in another embodiment.

In a preferred embodiment, the elastomeric composition includes a brominated isobutylene p-methyl styrene ("BIMSM") copolymer layer silicate nanocomposite. The preferred elastomer has a relatively low Mooney viscosity (ML 1+4 at 125° C.) of between 30 and 40 and preferably between 30 and 36. Preferably, the elastomer has a para-methyl styrene (PMS) content of 10 mol % to 12 mol %. About 2 mol % of the PMS groups are brominated. The BIMS is blended in solution or melt mixed with HPAs, followed by subsequent layered silicate addition.

In one embodiment, an air barrier can be made by the method of combining at least one random copolymer comprising a $C_4$ to $C_7$ isomonoolefin derived unit, at least one filler, and at least one PAO and at least one HPA, and at least one cure agent; and curing the combined components.

The elastomeric compositions as described above may be used in the manufacture of air membranes such as innerliners and innertubes used in the production of tires. Methods and equipment used to manufacture the innerliners and tires are well known in the art. The invention is not limited to any particular method of manufacture for articles such as innerliners or tires.

INDUSTRIAL APPLICABILITY

The elastomeric compositions may be extruded, compression molded, blow molded, injection molded, and laminated into various shaped articles including fibers, films, laminates, layers, industrial parts such as automotive parts, appliance housings, consumer products, packaging, and the like.

In particular, the elastomeric compositions are useful in articles for a variety of tire applications such as truck tires, bus tires, automobile tires, motorcycle tires, off-road tires, aircraft tires, and the like. Such tires can be built, shaped, molded, and cured by various methods which are known and will be readily apparent to those having skill in the art. The elastomeric compositions may either be fabricated into a finished article or a component of a finished article such as an innerliner for a tire. The article may be selected from air barriers, air membranes, films, layers (microlayers and/or multilayers), innerliners, innertubes, air sleeves, sidewalls, treads, tire curing bladders, and the like.

The elastomeric compositions of the present invention are useful in a variety of applications, particularly pneumatic tire components, hoses, belts such as conveyor belts or automotive belts, solid tires, footwear components, rollers for graphic arts applications, vibration isolation devices, pharmaceutical devices, adhesives, caulks, sealants, glazing compounds, protective coatings, air cushions, pneumatic springs, air bellows, accumulator bags, and bladders for fluid retention and curing processes. They are also useful as plasticizers in rubber formulations; as components to compositions that are manufactured into stretch-wrap films; as dispersants for lubricants; and in potting and electrical cable filling and cable housing materials.

The elastomeric compositions may also be useful in molded rubber parts and may find wide applications in automobile suspension bumpers, auto exhaust hangers, and body mounts. In yet other applications, the elastomer(s) or elastomeric compositions of the invention are also useful in medical applications such as pharmaceutical stoppers and closures and coatings for medical devices.

The elastomeric compositions of this invention are particularly suitable for tire innerliners and innertubes and other materials requiring good air retention. A tire with improved impermeability can allow for maintenance of correct inflation pressure; reduction in tire rolling resistance thus reducing fuel consumption due to the better inflation pressure retention; longer tire life due to better tire tread footprints and more even-wear performance; and safer and smoother steering response due to better inflation pressure retention.

The isobutylene-based elastomer useful in the invention can be blended with various other rubbers or plastics as disclosed herein, in particular thermoplastic resins such as nylons or polyolefins such as polypropylene or copolymers of polypropylene. These compositions are useful in air barriers such as tire curing bladders, tire innertubes, tire innerliners, air sleeves (such as in air shocks), diaphragms, as well as other applications where high air or oxygen retention is desirable. In one embodiment, the cured composition has a permeation coefficient 40° C. of 200 cc*mm/[$m^2$-day] or less, or 180 cc*mm/[$m^2$-day] or less, or 160 cc*mm/[$m^2$-day] or less, or 140 cc*mm/[$m^2$-day] or less. In some embodiments with improved impermeability, the PAO may have a kinematic viscosity at 100° C. in the range of 40 to 200 cSt, or in the range of 60 to 150 cSt, or preferably in the range of 80 to 120 cSt. In some embodiments with improved impermeability, the PAO has a molecular weight (Mw) of 1000 g/mole or more, or preferably 2000 g/mole or more, or more preferably 2500 g/mole or more, or 3000 g/mole or more, or 3500 g/mole or more. In other embodiments having improved impermeability the PAO may have a Mw in the range of 2000 g/mole to 4000 g/mole, or in the range of 2500 g/mole to 3500 g/mole.

In another embodiment, the elastomeric composition has improved flex fatigue properties. The elastomeric composition may have a fatigue life as measured by ASTM D 412 die C of 450,000 Kc or more, or 470,000 Kc or more, or 500,000 Kc or more, or in some embodiments 550,000 Kc or more, or 575,000 or more. In embodiments with improved flex fatigue, the PAO may have a kinematic viscosity at 100° C. in the range of 3 cSt to 20 cSt, or in the range of 5 cSt to 15 cSt, or preferably in the range of 6 cSt to 10 cSt.

EXAMPLES

The elastomeric compositions comprising at least one elastomer and at least one PAO and/or at least one HPA will now be further described with reference to the following non-limiting examples.

When possible, standard ASTM tests were used to determine the cured compound physical properties. Stress/strain properties (e.g., tensile strength, elongation at break, modulus values, energy to break) were measured according to ASTM D412 "Die-C" at room temperature using an Instron 4202. Tensile strength measurements were made at ambient temperature; the specimens (dog-bone shaped) had a restricted width of 6 mm and a restricted length of 33 mm between two tabs. Though the thickness of the test specimen was a nominal 2.00 mm, the thickness of the specimens varied and was measured manually by a Mitutoyo Digimatic Indicator connected to the system computer. The specimens were pulled at a crosshead speed 500 mm/min and the stress/strain data was recorded. The average stress/strain value of at least three specimens is reported. The error ($2\sigma$) in Tensile measurements is ±0.47 MPa. The error ($2\sigma$) in measuring 100% Modulus is ±0.11 MPa; the error ($2\sigma$) in measuring elongation is ±13%.

Cure properties were measured using an MDR 2000 from Alpha Technologies, Inc. at the indicated temperature and 0.5 degree arc, based on ASTM D 5289. The values "MH" and "ML" used herein refer to "maximum torque" and "minimum torque," respectively. The "MS" value is the Mooney scorch value, the "ML(1+8)" value is the Mooney viscosity value of the polymer, and the "ML(1+4)" value is the Mooney viscosity value of the composition. The error ($2\sigma$) in the Mooney viscosity measurement is ±0.65. The values of "Tc" are cure times in minutes, and "Ts" is scorch time in minutes.

Permeability was measured using a Mocon OxTran Model 2/61 oxygen transmission rate test apparatus. The oxygen transmission rate is measured under the principle of dynamic measurement of oxygen transport through a thin film. Compound samples are clamped into a diffusion cell. The samples are approximately 5.0 cm in diameter and about 0.5 mm thick. The cell is then purged of residual oxygen using a high purity nitrogen carrier gas. The nitrogen gas is routed to a sensor until a stable zero value is established. The measurement is typically conducted at 40° C. Pure oxygen air is then introduced into the outside of the chamber of the diffusion cell. The oxygen diffusing through the sample to the inside chamber is conveyed to a chamber which measures the oxygen diffusion rate. The oxygen diffusion rate is expressed as a transmission rate coefficient. The permeation coefficient is a measure of the transmission rate normalized for sample thickness (e.g., m) and is expressed as a volume of gas (e.g., cc) per unit area of the sample (e.g., $m^2$) in a discrete unit of time (e.g., 24 hours), and has the units of cc*mm/($m^2$-day). The permeability coefficient considers atmospheric pressure and is expressed as cc*mm/(m$^2$–day–mmHg). A relative rating for the compound may then be obtained by comparing the compound's permeation coefficient to that of the control compound.

Molecular weight of the hydrocarbon polymer additive was determined by gel permeation chromatography. The techniques for determining the molecular weight (Mn, Mw, and Mz) and molecular weight distribution (MWD) are generally described in U.S. Pat. No. 4,540,753, which is incorporated herein by reference. The polydispersion index (PDI) was calculated as Mw/Mn. The melt viscosity of the hydrocarbon polymer additives was determined using a Brookfield viscometer with a type "J" spindle, ASTM D-6267.

Other test methods are listed in Table 1.

TABLE 1

Test Methods

| Parameter | Units | Test |
|---|---|---|
| Mooney Viscosity (polymer) | | |
| ML 1 + 8, 125° C. | MU | ASTM D 1646 |
| Mooney Viscosity (composition) | | |
| ML 1 + 4, 100° C. | MU | ASTM D 1646 |
| Hardness | Shore A | ASTM D 2240 |
| Mooney Scorch Time | | |
| 125° C. for 60 min, 1 min preheat t5 | minutes | ASTM D 1646 |
| Moving Die Rheometer (MDR) | | |
| 160° C. for 60 min, ±0.5° arc | | ASTM D 5289 |
| ML | deciNewton · meter | |
| MH | dNewton · m | |
| t10 | minutes | |
| t90 | minutes | |
| PeakRate | dNm/min | |
| MH – ML | deciNewton · meter | |
| Moving Die Rheometer (MDR) | | |
| 180° C. for 30 min, ±0.5° arc | | ASTM D 5289 |
| ML | deciNewtonmeter | |
| MH | dNewton · m | |
| t10 | minutes | |
| t90 | minutes | |
| PeakRate | dNm/min | |
| MH – ML | deciNewton · meter | |
| Tensile Test | | |
| 300% Modulus | MPa | ASTM D 412 die C |
| Energy To Break | J | |
| Tensile Strength | MPa | |
| % Elongation at Break | % | |
| Die B Tear | | |
| Tear Resistance | N/mm | ASTM D 624 |
| Mocon Oxygen Permeability Test | | |
| 40° C., 20% oxygen concentration Permeation Coefficient | cc * mm(m$^2$-day) | See text. |
| Fatigue to Failure 135% strain | Kc | ASTM D4482 die C |
| Tg | ° C. | DSC |

The PAOs used in the examples were prepared with either BF$_3$ or AlCl$_3$ catalyst systems. Such materials are typically soluble in hexane making them suitable for use in solution prepared nanocomposites. Table 2 lists ranges for typical properties of the various PAOs used in the examples.

TABLE 2

PAO Typical Properties

| PAO | Molecular Weight | Density @ 23° C., g/cm$^3$ | Flash Point | Viscosity at 100° C., cSt | VI | Pour Point, ° C. |
|---|---|---|---|---|---|---|
| PAO-A | 450 | 0.816 | 225 | 4 | 123-126 | −57 to −66 |
| PAO-B | 530 | 0.822 | 245 | 6 | 133-138 | −57 |
| PAO-C | 590 | 0.828 | 255 | 8 | 135-139 | −54 to −48 |
| PAO-D | 670 | 0.831 | 265 | 10 | 136-137 | −54 to −48 |
| PAO-E | 2200 | 0.845 | 285 | 40 | 152-147 | −39 |
| PAO-F | 3000 | 0.848 | 290 | 100 | 179-170 | −33 to −30 |

A listing of various components used in the elastomeric compositions of the examples is in Table 3.

TABLE 3

Various Components in the Elastomeric Compositions

| Material | Brief Description | Source |
|---|---|---|
| BIIR 2222 | Brominated butyl rubber, Mooney Viscosity of 27-37 | Bromobutyl-2222, ExxonMobil Chemical Company |
| Exxpro MDX 03-1 | BIMSM | Exxon Mobil Chemical Company |
| N660 | Carbon black. | |
| Cloisite Na+ | Clay | Southern Clay Products |
| Struktol 40 MS | Composition of aliphatic-aromatic-naphthenic resins. | Struktol Co. of America (Stow, OH) |
| Naphthenic Oil | Process oil | Calsol 810, Calument |
| Oppera 103J | Hydrocarbon polymer additive. | ExxonMobil Chemical Company |
| SP-1068 | Alkyl phenol formaldehyde resin | Schenectady Int. (Schenectady, NY) |
| Stearic Acid | Activator | ACI 5106NF, Witco Manufacturing |
| ZnO | Curative; Zinc Oxide | Kadox 9111, Zinc Corp of America |
| MBTS | 2-Mercaptobenzothiazole disulfide | R.T. Vanderbilt (Norwalk, CT) or Elastochem (Chardon, OH) |
| Sulfur | Crosslinking Agent | Rubermakers Sulfur, RE Carroll |

Example 1

Six PAOs were evaluated as process aids in model tire innerliner compounds. Naphthenic oil is typically used in such compounds at 8 phr, and in the compounds in Example 1 naphthenic oil was replaced with an equal amount of PAO. The compound formulations are listed in Table 4, all amounts listed are in phr.

TABLE 4

Model Tire Inner liner Compound Formulations

| | Compound | | | | | | |
|---|---|---|---|---|---|---|---|
| | 1 | 2 | 3 | 4 | 5 | 6 | 7 |
| BIIR 2222 | 100.00 | 100.00 | 100.00 | 100.00 | 100.00 | 100.00 | 100.00 |
| N660 | 60.00 | 60.00 | 60.00 | 60.00 | 60.00 | 60.00 | 60.00 |
| Naphthenic Oil | 8.00 | | | | | | |
| Struktol 40MS | 7.00 | 7.00 | 7.00 | 7.00 | 7.00 | 7.00 | 7.00 |
| SP-1068 | 4.00 | 4.00 | 4.00 | 4.00 | 4.00 | 4.00 | 4.00 |
| Stearic Acid | 1.00 | 1.00 | 1.00 | 1.00 | 1.00 | 1.00 | 1.00 |
| PAO-A | | 8.00 | | | | | |
| PAO-B | | | 8.00 | | | | |
| PAO-C | | | | 8.00 | | | |
| PAO-D | | | | | 8.00 | | |
| PAO-E | | | | | | 8.00 | |
| PAO-F | | | | | | | 8.00 |
| ZnO | 1.00 | 1.00 | 1.00 | 1.00 | 1.00 | 1.00 | 1.00 |
| MBTS | 1.25 | 1.25 | 1.25 | 1.25 | 1.25 | 1.25 | 1.25 |
| Sulfur | 0.50 | 0.50 | 0.50 | 0.50 | 0.50 | 0.50 | 0.50 |

The compounds were mixed in a 1 L banbury internal mixer using a 2-stage mixing procedure with the vulcanization system (ZnO, MBTS, and sulfur) added in the second stage. The compounds were tested for a range of processing, curing, and physical properties, the data is presented in Table 5.

TABLE 5

Properties of Model Tire Inner liner Compounds with PAO

| | Compound | | | | | | |
|---|---|---|---|---|---|---|---|
| | 1 Oil | 2 PAO-A | 3 PAO-B | 4 PAO-C | 5 PAO-D | 6 PAO-E | 7 PAO-F |
| Mooney Viscosity | | | | | | | |
| ML 1 + 4 [MU] | 55 | 51.5 | 54.2 | 54.4 | 54.4 | 56.2 | 55.8 |
| MDR times by 10's | | | | | | | |
| Test Temp [° C.] | 160 | 160 | 160 | 160 | 160 | 160 | 160 |
| MH-ML [dNm] | 3.4 | 3.3 | 3.4 | 3.5 | 3.4 | 3.5 | 3.4 |
| t10 [Min] | 1.8 | 1.8 | 1.7 | 1.8 | 1.8 | 1.8 | 1.7 |
| t90 [Min] | 9.8 | 10.9 | 11.9 | 11.1 | 11.6 | 10.4 | 10.2 |
| Peak Rate [dNm/min] | 0.8 | 0.7 | 0.8 | 0.7 | 0.7 | 0.7 | 0.7 |
| Tensile 1000 Test | | | | | | | |
| Tensile Strength [MPa] | 8.3 | 8.9 | 9.3 | 8.3 | 9.4 | 9.2 | 9.5 |
| % Elongation at Break [%] | 765 | 823 | 850 | 752 | 859 | 843 | 825 |
| 300% Modulus [MPa] | 2.9 | 2.7 | 3.2 | 3.0 | 3.1 | 2.9 | 3.2 |
| Hardness A [ShoreA] | 40 | 39 | 42 | 42 | 43 | 44 | 43 |
| Tear Resistance [N/mm] | 48.7 | 47.5 | 52.8 | 51.4 | 49.4 | 49.1 | 49.2 |
| Fatigue Life [Kc] | 431055 | 432345 | 505638 | 580845 | 568774 | 251194 | 131651 |

Typically, a compound Mooney viscosity between 50 and 65 MU, a tensile strength of 9 to 11 MPa, an elongation at break above 700%, and a 300% modulus of 4 MPa or lower are necessary in order to ensure adequate processing qualities in a factory and adequate performance in a tire. As seen in Table 5, the compounds in Example 1 with PAO showed good processing qualities (Mooney viscosity). The vulcanization kinetics (induction time t10, cure time t90) and state of cure (MH-ML) of the compounds containing PAO were equivalent to that of Compound 1 containing naphthenic oil; additionally, compound hardness and tear strength were equivalent. Furthermore, there was significant improvement in fatigue resistance when replacing naphthenic oil with PAO-C and PAO-D. Fatigue resistance was best in the compounds containing PAOs with a kinematic viscosity around 8 cSt.

Table 6 illustrates the effect of the PAO on compound permeability. Notably, the impermeability improved as the PAO molecular weight increased. PAO-F had the best impermeability performance and was the highest molecular weight PAO used in Example 1.

TABLE 6

Effect of PAO on Permeability Coefficient

| | Compound | | | | | |
|---|---|---|---|---|---|---|
| | 2 PAO-A | 3 PAO-B | 4 PAO-C | 5 PAO-D | 6 PAO-E | 7 PAO-F |
| PAO Molecular Weight (Mn) | 450 | 530 | 590 | 670 | 2200 | 3000 |
| Mocon Oxygen Permeability Test (40° C., 20% oxygen | 250 | 246 | 243 | 236 | 219 | 207 |

TABLE 6-continued

Effect of PAO on Permeability Coefficient

| | Compound | | | | | |
|---|---|---|---|---|---|---|
| | 2 PAO-A | 3 PAO-B | 4 PAO-C | 5 PAO-D | 6 PAO-E | 7 PAO-F |
| concentration) Permeation Coefficient [cc * mm/ m²-day] | | | | | | |

Example 2

The data in Table 6 demonstrated that PAO-F with the highest molecular weight had the lowest permeability (i.e., best impermeability). In Example 2, varying amounts of PAO-F were used, the compound formulations are listed in Table 7.

TABLE 7

Compound Formulations

| | Compound | | | |
|---|---|---|---|---|
| | 8 | 9 | 10 | 11 |
| Exxpro MDX 03-1 | 100.00 | 100.00 | 100.00 | 100.00 |
| Cloisite Na+ | 6.00 | 6.00 | 6.00 | 6.00 |
| PAO-F | 2.00 | 4.00 | 6.00 | 8.00 |
| N660 | 60.00 | 60.00 | 60.00 | 60.00 |
| Struktol 40MS | 7.00 | 7.00 | 7.00 | 7.00 |
| SP-1068 | 4.00 | 4.00 | 4.00 | 4.00 |
| Stearic acid | 1.00 | 1.00 | 1.00 | 1.00 |
| ZnO | 1.00 | 1.00 | 1.00 | 1.00 |
| MBTS | 1.25 | 1.25 | 1.25 | 1.25 |
| Sulfur | 0.50 | 0.50 | 0.50 | 0.50 |

Table 8 demonstrates the effect of varying the amount of PAO-F on compound properties and permeability. Increasing the loading level of PAO-F from 2 phr to 8 phr (in the absence of naphthenic oil) resulted in a decrease in compound viscosity; acceptable tensile strength and elongation at break properties, although the 300% modulus was higher; good tear strength; and low permeability at lower PAO levels (which corresponded to high viscosity). Although permeability and viscosity are important, a balance of properties was achieved that was better than that obtained with the use of just naphthenic oil.

TABLE 8

Effect of PAO-F on Compound Properties and Permeability

| | Compound | | | |
|---|---|---|---|---|
| | 8 | 9 | 10 | 11 |
| Mooney ML (1 + 8) + Stress Relax | | | | |
| Visc@4 [MU] | 69.7 | 62.9 | 62.6 | 57.7 |
| Tensile 1000 Test | | | | |
| Tensile Strength [MPa] | 10.4 | 10.0 | 9.7 | 9.2 |
| % Elongation at Break [%] | 709 | 676 | 714 | 736 |
| 300% Modulus [MPa] | 6.3 | 5.9 | 5.5 | 4.9 |

TABLE 8-continued

Effect of PAO-F on Compound Properties and Permeability

| | Compound | | | |
|---|---|---|---|---|
| | 8 | 9 | 10 | 11 |
| Die B Tear | | | | |
| Peak Load [N] | 118.9 | 108.8 | 116.2 | 115.4 |
| Mocon Oxygen Permeability Test (40° C., 20% oxygen concentration) | | | | |
| Permeability Coefficient [cc * mm/m²-day] | 120 | 136 | 139 | 157 |

Example 3

In Example 3, masterbatches of Exxpro elastomer with varying amounts of hydrocarbon polymer additive were prepared. Oppera 103J is a cycloaliphatic-cyclodiene hydrocarbon polymer additive with a low degree of aromaticity. The rubber masterbatches were an intimate blend prepared via a solution blending process. MB-1, MB-2, and MB-3 contained approximately 5, 11, and 17 phr of Oppera 103J respectively. Model tire innerliner compounds were then made containing the masterbatches. Table 9 lists the tire innerliner compound formulations. The compounds were tested for a range of processing, curing, and physical properties, with the results listed in Table 10.

TABLE 9

Model Tire Inner liner Compound Formulations Containing Exxpro/Oppera Masterbatches

| | Compound | | | | |
|---|---|---|---|---|---|
| | 12 | 13 | 14 | 15 | 16 |
| BIIR 2222 | 100.00 | | | | |
| Exxpro MDX 03-1 | | 100.00 | | | |
| MB-1 (Exxpro & Oppera 103J) | | | 105.26 | | |
| MB-2 (Exxpro & Oppera 103J) | | | | 111.10 | |
| MB-3 (Exxpro & Oppera 103J) | | | | | 117.65 |
| N660 | 60.00 | 60.00 | 60.00 | 60.00 | 60.00 |
| Naphthenic Oil | 8.00 | 3.50 | | | |
| Struktol 40MS | 7.00 | 7.00 | 7.00 | 7.00 | 7.00 |
| SP-1068 | 4.00 | 4.00 | 4.00 | 4.00 | 4.00 |
| Stearic Acid | 1.00 | 1.00 | 1.00 | 1.00 | 1.00 |
| ZnO | 1.00 | 1.00 | 1.00 | 1.00 | 1.00 |
| MBTS | 1.25 | 1.25 | 1.25 | 1.25 | 1.25 |
| Sulfur | 0.50 | 0.50 | 0.50 | 0.50 | 0.50 |

TABLE 10

Properties of Model Tire Inner liner Compounds With Exxpro/Oppera Masterbatches

| | Compound | | | | |
|---|---|---|---|---|---|
| | 12 | 13 | 14 | 15 | 16 |
| Mooney ML (1 + 8) + Stress Relax | | | | | |
| Test Temp [° C.] | 100 | 100 | 100 | 100 | 100 |
| Mn [MU] | 53.9 | 59.4 | 60.6 | 55.9 | 50.1 |
| Visc@4 [MU] | 55.0 | 60.3 | 61.6 | 57.1 | 51.1 |
| Visc@8 [MU] | 54.4 | 59.6 | 60.7 | 56.1 | 50.3 |
| Decay tx90 [sec] | 20.3 | 9.7 | 11.3 | 10.6 | 9.5 |

TABLE 10-continued

Properties of Model Tire Inner liner Compounds With Exxpro/Oppera Masterbatches

| | Compound | | | | |
|---|---|---|---|---|---|
| | 12 | 13 | 14 | 15 | 16 |
| MDR times by 25's | | | | | |
| Test Temp [° C.] | 170 | 170 | 170 | 170 | 170 |
| MH-ML [dNm] | 2.9 | 5.8 | 5.3 | 4.3 | 3.9 |
| t25 [Min] | 1.6 | 2.4 | 2.1 | 2.4 | 2.2 |
| t90 [Min] | 5.7 | 6.0 | 4.9 | 24.5 | 5.4 |
| Peak Rate [dNm/min] | 1.2 | 1.9 | 2.5 | 1.1 | 1.8 |
| Mocon Oxygen Permeability Test (40° C., 20% oxygen concentration) | | | | | |
| Permeation Coefficient [cc * mm(m$^2$-day)] | 188 | 137 | 105 | 99 | 88 |
| Rating | 100 | 73 | 56 | 53 | 47 |

An elastomeric composition's Mooney viscosity is indicative of how well a compound will process through a tire factory and is preferably within the range of about 50 to about 65 Mooney units. The data in Table 10 illustrates that the elastomeric compositions in Example 3 had a Mooney viscosity within the preferred range and acceptable Rheometer cure kinetics. Additionally, a permeation coefficient of between 88 and 99 was achieved in Compounds 15 and 16, which represents approximately a 50% reduction as compared to bromobutyl (Compound 12). The low permeability of Compounds 15 and 16 was achieved without any tradeoff in viscosity.

Example 4

In Example 4, masterbatches of Exxpro, Oppera, and PAO were prepared. The masterbatch samples were prepared by a melt mixing method. A Haake mixer operating at 60 rpm and a mixing temperature of 140° C. was used. The components were added in the following sequence: 1) Exxpro elastomer was added to the mixer and mixed for 3 minutes, 2) Oppera was added to the mixer and mixed for 3 minutes, and 3) PAO was added to the mixer and mixed for 6 (or 7) minutes. The total active mixing time was approximately 12 minutes. Table 12 lists the masterbatch formulations used in Example 4. The Oppera content ranged from 12.5 to 25 phr while the PAO content ranged from 0.00 to 12.5 phr.

Table 13 lists the formulations for the elastomeric compositions containing the masterbatches. In addition to the masterbatch the tire innerliner compounds contained carbon black, other processing aids, and a vulcanization system. The control compound (Compound 17) contained only naphthenic oil. The total additive content did not exceed 25 phr versus Exxpro to maintain the viscosity of the compound. The compounds were tested for various properties and the data is listed in Table 14.

TABLE 12

Exxpro-PAO-Oppera Masterbatch Formulations

| | Masterbatch | | | | | | |
|---|---|---|---|---|---|---|---|
| | MB-A1 | MB-A2 | MB-B1 | MB-B2 | MB-B3 | MB-C1 | MB-C2 |
| Exxpro | 100.0 | 100.0 | 100.0 | 100.0 | 100.0 | 100.0 | 100.0 |
| PAO-F | 5.0 | 12.0 | 0.0 | 0.0 | 0.0 | 6.0 | 12.5 |
| Oppera 103J | 20.0 | 13.0 | 25.0 | 25.0 | 11.1 | 19.0 | 12.5 |

TABLE 13

Elastomeric Composition Formulations

| | Compound | | | | | | | |
|---|---|---|---|---|---|---|---|---|
| | 17 | 18 | 19 | 20 | 21 | 22 | 23 | 24 |
| BIIR 2222 | 100.00 | | | | | | | |
| MB-A1 | | 125.00 | | | | | | |
| MB-A2 | | | 125.00 | | | | | |
| MB-B1 | | | | 125.00 | | | | |
| MB-B2 | | | | | 125.00 | | | |
| MB-B3 | | | | | | 111.10 | | |
| MB-C1 | | | | | | | 125.00 | |
| MB-C2 | | | | | | | | 125.00 |
| N660 | 60.00 | 60.00 | 60.00 | 60.00 | 60.00 | 60.00 | 60.00 | 60.00 |
| Naphthenic oil | 8.00 | 8.00 | 8.00 | 8.00 | 8.00 | 8.00 | 8.00 | 8.00 |
| Struktol 40MS | 7.00 | 7.00 | 7.00 | 7.00 | 7.00 | 7.00 | 7.00 | 7.00 |
| SP1068 | 4.00 | 4.00 | 4.00 | 4.00 | 4.00 | 4.00 | 4.00 | 4.00 |
| Stearic Acid | 1.00 | 1.00 | 1.00 | 1.00 | 1.00 | 1.00 | 1.00 | 1.00 |
| ZnO | 1.00 | 1.00 | 1.00 | 1.00 | 1.00 | 1.00 | 1.00 | 1.00 |
| MBTS | 1.25 | 1.25 | 1.25 | 1.25 | 1.25 | 1.25 | 1.25 | 1.25 |
| Sulfur | 0.50 | 0.50 | 0.50 | 0.50 | 0.50 | 0.50 | 0.50 | 0.50 |

TABLE 14

Properties of Elastomeric Compositions Containing Exxpro-PAO-Oppera Masterbatches

| | | Compound | | | | | | |
|---|---|---|---|---|---|---|---|---|
| | 17 | 18 MB-A1 | 19 MB-A2 | 20 MB-B1 | 21 MB-B2 | 22 MB-B3 | 23 MB-C1 | 24 MB-C2 |
| Mooney ML(1 + 8) Stress 100 C., 8 minutes, 1 min preheat, 1 min relaxation | | | | | | | | |
| Mn [MU] | | 43.9 | 39.5 | 47.8 | 45.6 | 57 | 41.6 | 39 |
| Visc@4 [MU] | 56.2 | 45 | 40.4 | 48.9 | 46.5 | 58.1 | 42.5 | 39.8 |
| Visc@8 [MU] | 55.6 | 44 | 39.6 | 47.9 | 45.6 | 57.2 | 41.7 | 39.2 |
| Decay tx90 [sec] | | 9.6 | 7.7 | 9.6 | 9.7 | 10.4 | 8.3 | 7.0 |
| MDR times by 25's 60 minutes, 170° C., 0.5 arc | | | | | | | | |
| MH-ML [dNm] | 3.1 | 3.5 | 3.1 | 3.8 | 3.2 | 5.2 | 3.2 | 3.3 |
| t25 [Min] | 1.7 | 2.0 | 2.1 | 2.3 | 2.1 | 2.3 | 2.1 | 2.3 |
| t90 [Min] | 5.6 | 5.3 | 5.7 | 5.4 | 6.5 | 5.8 | 4.8 | 5.0 |
| Peak Rate [dNm/min] | 1.1 | 1.6 | 1.2 | 1.6 | 1.2 | 1.9 | 1.5 | 1.4 |
| Mocon Oxygen Permeability Test (40° C., 20% oxygen concentration) | | | | | | | | |
| Permeation Coefficient [cc * mm(m$^2$-day)] | 195 | 114 | 173 | 88 | 80 | 94 | 126 | 177 |
| Rating | 100 | 59 | 89 | 45 | 41 | 48 | 65 | 91 |

The compound viscosity of the samples was adjusted by varying the amounts of the Oppera or PAO in the Exxpro masterbatch, with compound viscosity ranging from 40 to 58 Mooney units.

The vulcanization kinetics of the samples were all within an acceptable range, with the MH-ML (delta torque (ΔT)) varying from 3.08 to 3.79 and with Compound 22 (containing a low level of Oppera) having a ΔT of 5.22. Compound cure times (induction time, t25, and cure time, t90) were all satisfactory.

The permeation coefficient for the compounds containing only Oppera was in the range of 80 to 94 cc*mm/(m$^2$-day). This is consistent with the compounds in Example 3.

The use of a PAO as a processing aid matched the performance of naphthenic oil, which is typically used in halobutyl compounds, with no trade-offs in the elastomeric composition's tear strength modulus or tensile strength. Improvements in compound fatigue life were also seen with the use of PAO as a replacement for naphthenic oil.

Further, increasing the molecular weight of the PAO allowed for an improvement in impermeability (i.e., reduction in permeability). Additionally, using PAOs with higher molecular weights allowed for a decrease in the elastomeric composition's viscosity. This may allow viscosity and permeability to be optimized to meet specific targets that are required for an end product.

The addition of HPA resins allowed for a reduction in permeability. Furthermore, the addition of HPAs lead to reduction and further optimization of the Mooney viscosity.

Blending of PAO and HPA allowed for an improved balance of properties, such as that which are needed for a tire innerliner compounds. In the elastomeric compositions where PAO and HPA were blended, a permeation coefficient below 130 cc*mm(m$^2$-day) was measured while still obtaining acceptable compound viscosities.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A cured elastomeric composition, comprising:
   a) at least one $C_4$-$C_7$ monoolefin elastomer;
   b) from 2 to 40 phr of at least one polyalphaolefin, wherein the polyalphaolefin comprises a oligomers of one or more $C_2$ to $C_{20}$ alpha-olefins having a kinematic viscosity at 100° C. of 3 to 3000 cSt and a Mw/Mn of less than 4; and
   c) at least one non-polar hydrocarbon polymer additive, wherein the hydrocarbon polymer additive comprises greater than 75 wt % of cyclic components and has a glass transition temperature in the of 0° C. to 80° C. and a softening point in the range of about 115° C. to about 130° C.;
   wherein the composition has permeation coefficient at 40° C. of 160 cc*mm/(m$^2$-day) or less.

2. The elastomeric composition of claim 1, wherein at least one elastomer is selected from the group consisting of butyl rubber, halogenated butyl rubber, star-branched butyl rubber, halogenated star-branched butyl rubber, poly(isobutylene-co-p-methylstyrene), halogenated poly(isobutylene-co-p- methylstyrene), general purpose rubber, natural rubber, polybutadiene rubber, polyisoprene rubber, styrene-butadiene rubber, styrene-isoprene-butadiene rubber, isoprene-butadiene rubber, high cis-polybutadiene, ethylene-propylene rubber, ethylene-propylene-diene rubber, nitrile rubber, brominated butyl rubber, chlorinated butyl rubber, star-branched polyisobutylene rubber, and mixtures thereof.

3. The elastomeric composition of claim 1, wherein at least one elastomer is a halogenated poly(isobutylene-co-p-methylstyrene).

4. The composition of claim 1, wherein the polyalphaolefin has a kinematic viscosity at 100° C. in the range of 80 to 120 cSt.

5. The composition of claim 1, wherein the polyalphaolefin has a molecular weight (Mw) of 2000 g/mole or more.

6. The composition of claim 1, wherein the elastomeric composition further comprises an exfoliated clay selected from the group consisting of exfoliated natural or synthetic montmorillonite, nontronite, beidellite, volkonskoite, laponite, hectorite, saponite, sauconite, magadite, kenyaite, steensite, vermiculite, halloysite, aluminate oxides, hydrotalcite, and mixtures thereof.

7. The composition of claim 1, wherein the elastomeric composition is substantially free of naphthenic oil.

8. The composition of claim 1, wherein the hydrocarbon polymer additive comprises dicyclopentadiene.

9. The elastomeric composition of claim 1, wherein the cured elastomeric composition is an air barrier, a tire, tire innerliner, innertube, or a tire component, or a hose.

10. The composition of claim 1, wherein the PAO has a kinematic viscosity at 100° C. in the range of 6 to 10 cSt.

11. The composition of claim 1, wherein the hydrocarbon polymer additive has a glass transition temperature of about 70° C.

12. The composition of claim 1 wherein the hydrocarbon polymer additive has a glass transition temperature in the range of 40° to 60° C.

* * * * *